UNITED STATES PATENT OFFICE 2,549,273

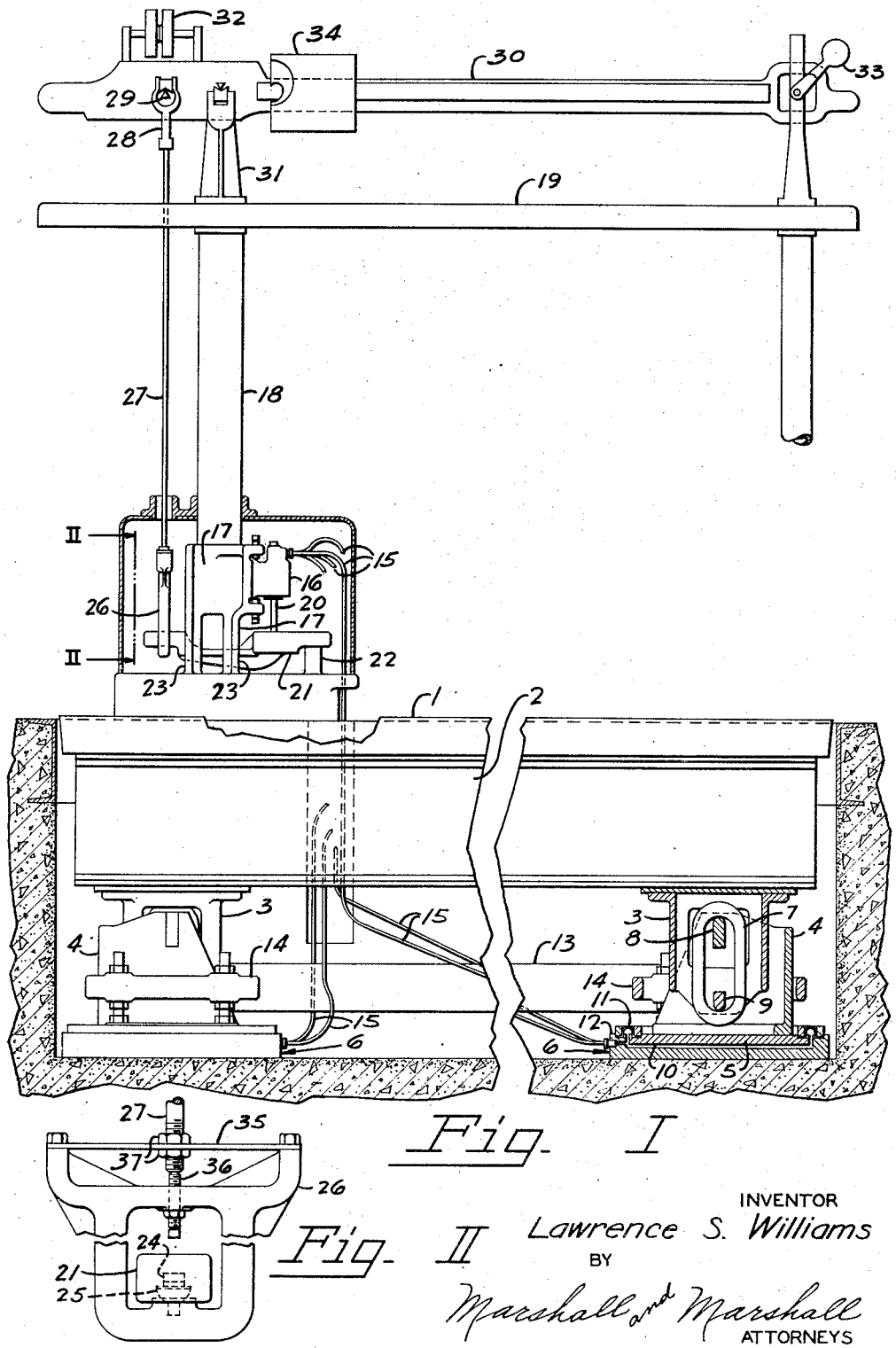
Fig. I
Fig. II
INVENTOR
Lawrence S. Williams
BY
Marshall and Marshall
ATTORNEYS April 17, 1951     L. S. WILLIAMS     2,549,273
HYDRAULIC WEIGHING SCALE
Filed Feb. 2, 1946     3 Sheets-Sheet 2
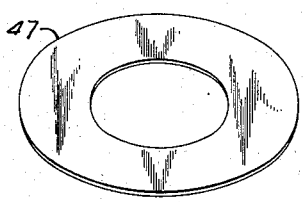
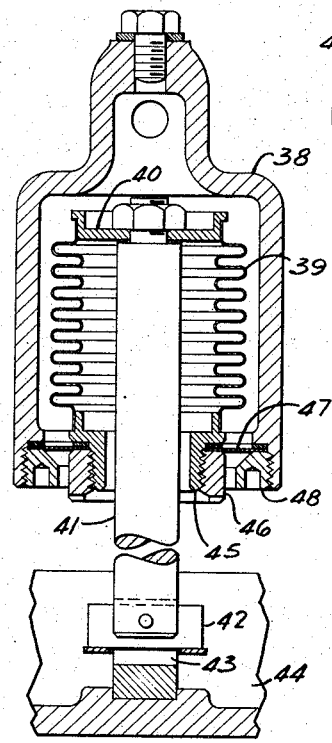
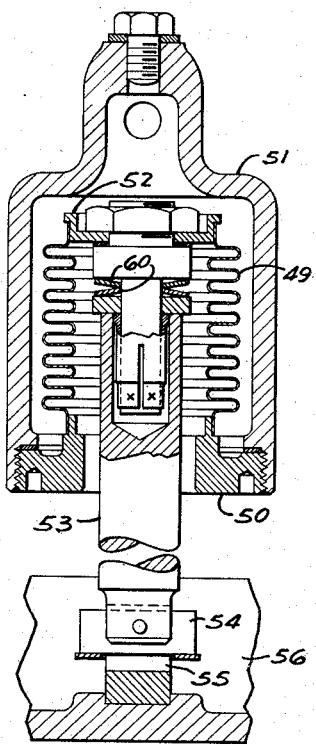
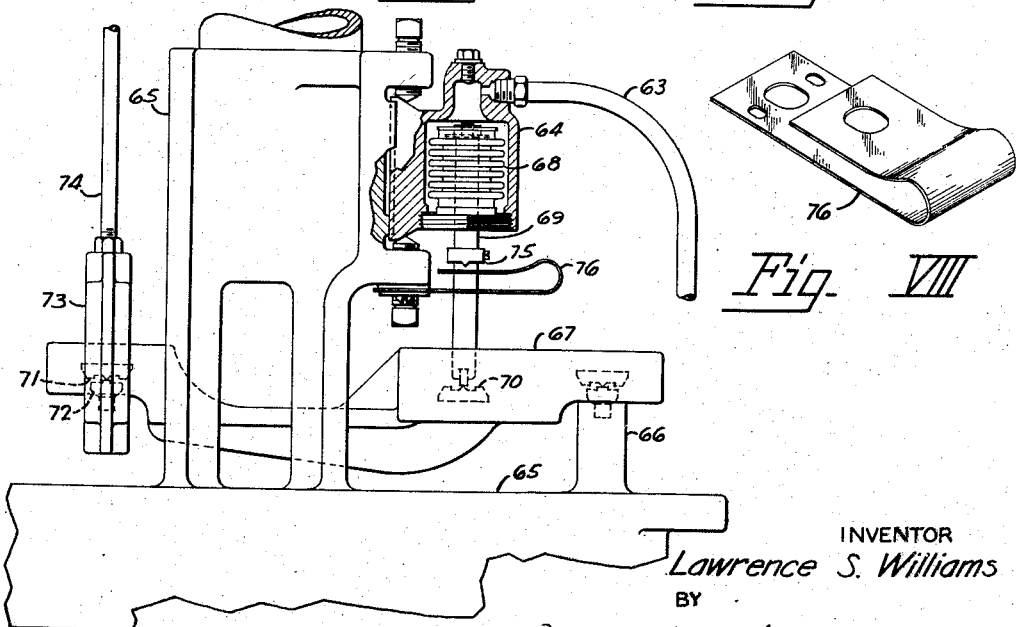
INVENTOR
Lawrence S. Williams
BY
Marshall & Marshall
ATTORNEYS

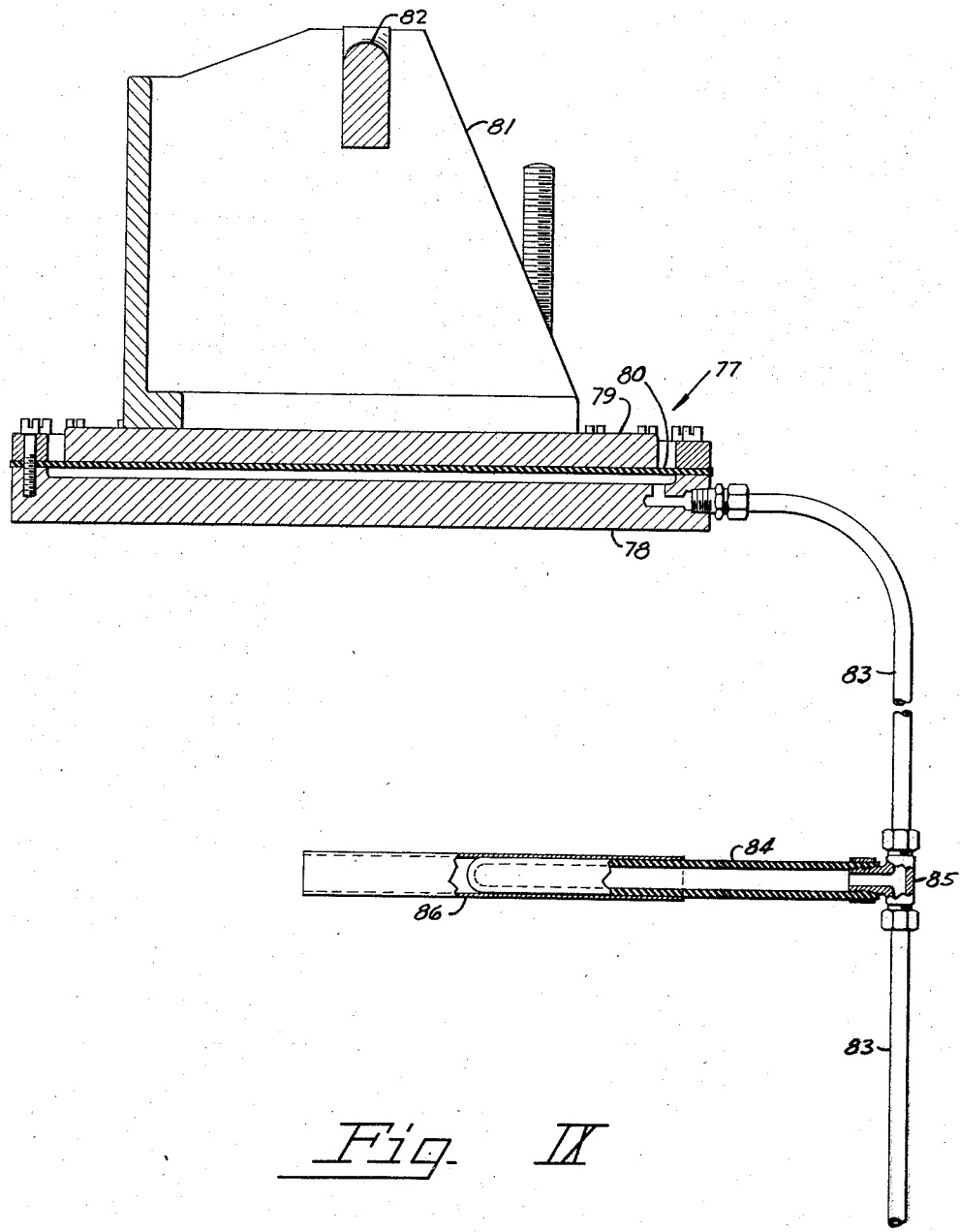
Fig. IX
INVENTOR
Lawrence S. Williams
BY
Marshall & Marshall
ATTORNEYS

HYDRAULIC WEIGHING SCALE

Lawrence S. Williams, Toledo, Ohio, assignor to Toledo Scale Company, Toledo, Ohio, a corporation of New Jersey Application February 2, 1946, Serial No. 645,026

14 Claims. (Cl. 265—47)

This invention relates to weighing scales employing hydraulic force transmitting systems and in particular to a method of reducing errors in the force transmission ratio of the hydraulic systems.

A hydraulic weighing scale consists of a load receiver which is supported on a plurality of hydraulic capsules. Each of the capsules is hydraulically connected to a bellows which in turn acts mechanically on a lever operatively connected to load counterbalancing mechanism. The hydraulic systems replace the lever system supporting the load receiver of a conventional weighing scale. In order that a hydraulic weighing scale be satisfactory in operation it is necessary that the force transmission ratio of the various hydraulic systems be independent of the load being weighed. The available elements for use in hydraulic systems have certain resilient characteristics which introduce variations in the force transmission ratio of the hydraulic systems as the loads are varied. These errors not being linear with load can not be eliminated by changes in lever ratio or other well known scale adjusting methods.

The principal object of this invention is to provide a method for substantially reducing or eliminating nonlinear errors which may be observed in hydraulic weighing scale elements.

Another object of the invention is to correct the indication of a hydraulic weighing scale employing hydraulic elements exhibiting parallel force transmission paths, one of which is hydraulic and the other mechanical, by including a resilient element arranged such that by variation of the force distribution between the paths with variation in load the error in transmission of one path is corrected in the other.

A still further object of the invention is to provide in a hydraulic force transmitting system having resilient elements means for deforming the resilient elements according to the load to correct the force transmission ratio of the hydraulic system.

A still further object of the invention is to provide a resilient element which is loaded in a manner such that it acts as a resilient connection throughout only a portion of the weighing capacity of the scale.

These and other objects and advantages are apparent from the following description in which reference is made to the accompanying drawings illustrating examples of the invention.

According to the invention, nonlinear errors in force transmission which are observed in a hydraulic weighing scale system are corrected by providing in the system a resilient member arranged to vary with load the force transmitted through the elastic portions of the hydraulic elements such that the effect of the deflection of the resilient member modifies the force transmission of the hydraulic system and corrects the nonlinear errors observed therein. The combination of the resilient member and the hydraulic system may take many forms. The resilient member may additively apply force to the counterbalance or it may divert a portion of the load force from the counterbalance. In either event the hydraulic force transmitting system and the resilient member, which may include portions of the hydraulic system, have mutually corrective nonlinear errors which cancel each other to produce an extremely accurate force transmission system for a weighing scale.

Examples of structures which may be incorporated in hydraulic weighing scale force transmitting systems to modify the force transmission ratio are shown in the accompanying drawings.

In the drawings:

Figure I is a front elevation, partly in section, of a hydraulic weighing scale embodying the invention.

Figure II is an elevation of a stirrup constructed according to the invention as seen from the line II—II of Figure I.

Figure III is a vertical section through a hydraulic pressure receiving unit suitable for use in a hydraulic weighing scale, the pressure receiver being constructed according to the invention.

Figure IV is a perspective view of a diaphragm used in the pressure receiver shown in Figure III, the diaphragm serving as the resilient element or member in the system for the measurement of hydraulic pressure.

Figure V illustrates another hydraulic pressure receiver having means for correcting nonlinear errors.

Figure VI is an enlarged fragmentary detail of the error correcting portion of the pressure receiver shown in Figure V.

Figure VII is a fragmentary elevation, partly in section, of another pressure receiver whose force transmission ratio is corrected according to the invention.

Figure VIII is a perspective view of the resilient error correcting member employed in the structure shown in Figure VII.

Figure IX is a side elevation of another form of hydraulic load supporting capsule illustrating still another method of correcting the errors in the hydraulic force transmitting system.

A hydraulic weighing scale consists of a load receiver having a deck 1 supported on longitudinal girders 2. Each end of each of the girders 2 is carried on a depending bracket 3 which fits in loose telescopic arrangement with an open-sided box-like frame 4 supported on a diaphragm 5 of a hydraulic capsule 6. A single link 7 suspended from a crossbar 8 spanning the top of the box-like frame 4 engages a similar bar 9 extending transversely across the bottom of the bracket 3. The links 7 serve to swingably support the load receiver.

The diaphragm 5 of the hydraulic capsule 6 is supported on a hydraulic fluid enclosed within a chamber 10 formed within the capsule beneath the diaphragm. The chamber 10 is sealed by a flexible membrane 11 attached to an upstanding rim 12 of the capsule 6 and the adjoining surface of the diaphragm 5.

In order to achieve high accuracy in a hydraulic scale it is necessary that the diaphragm 5 of the capsule 6 remain horizontal under all conditions of loading. For this reason a single link such as the link 7 is employed at each corner of the load receiver so that deflections of the girders 2 will not produce tipping of the capsule diaphragms 5. Furthermore, since the load is applied through the link 7 to the bar 8 located at some distance above the diaphragm, it is necessary to support the diaphragm against overturning moments. This support is provided by a framework having a central portion 13 extending parallel to the girders 2 and having cross arms at each of its ends terminating in rings 14 encircling the box-like frames 4 and rigidly secured to the diaphragms 5. This framework does not carry any of the load but merely serves to hold the diaphragms 5 in true horizontal position at all times.

Hydraulic pressure generated within the capsules by loads applied to the load receiver is transmitted through tubes 15 to hydraulic pressure receivers 16 mounted on a pedestal 17 which also serves as a support for one leg 18 of a beam stand 19. Each of the pressure receivers 16 includes a bellows which acts against a strut 20 whose lower end is pivotally supported on a load pivot of a gathering lever 21. The gathering lever 21 is pivotally carried on a fulcrum stand 22 erected from the base of the pedestal 17. The lever 21 extends through between legs 23 of the stand 17 and has a power pivot 24 (Figure II) engaging a bearing 25 fitted in a stirrup 26 suspended from the bottom end of a steelyard rod 27. The upper end of the steelyard rod terminates in a stirrup 28 pivotally supported on a load pivot 29 of a weighbeam 30. The weighbeam 30 is fulcrumed on a beam stand 31 erected from the beam shelf 19 and is provided with accessories, such as balancing weights 32 and a trig loop lock 33. A poise 34, adapted to slide along the length of the weighbeam 30, counterbalances loads applied through the steelyard rod 27.

The capsule 6 and the pressure receiver 16, when assembled as a force transmitting system, show a residual error at half capacity when the scale is adjusted to give correct indication at no load and at full load. With the best obtainable elements the indication at half load or half capacity is slow, i. e. the indication is less than the actual load on the scale, and the error diminishes as no load or full load is approached.

Experiments indicate that the bellows of the pressure receiver is the chief source of error. When the hydraulic fluid is applied to the exterior of the bellows (externally stressed bellows) and the average ratio of mechanical force to hydraulic pressure for a range of pressures is determined, it is found that the ratio of force to pressure at light load is less than the average and that as the load increases the ratio also increases. If an arbitrary ratio greater than the maximum observed ratio is assumed as the true ratio the error in force transmission is minus and its magnitude increases at a decreasing rate. If the average ratio is assumed as the correct ratio the error is minus and increases at a decreasing rate during the first portion of the weighing range and decreases to zero as full capacity is approached.

When the hydraulic pressure is applied to the inside of the bellows (internally stressed bellows) the sign of the observed errors in force transmission is reversed from that observed with externally stressed bellows. The internally stressed bellows behaves much like a diaphragm and appears to get stiffer as the load is increased. The stiffening of the diaphragm or bellows acts to decrease the force transmission.

The first method of correcting the error of an externally stressed bellows consists of adjusting the lever ratio of the lever 21, the weighbeam 30, or the weight of the poise 34 so that the scale indications are correct at zero and at half capacity. If nothing further is done the error at full capacity may be approximately four times as great as the original error observed at half capacity. To correct that portion of the weighing range lying between half and full capacity the stirrup 26 is provided with a transverse leaf spring 35 to whose midpoint the steelyard rod 27 is attached. The initial spacing of the stirrup 26 and the steelyard rod 27 is controlled by a screw 36 threaded through a cross member of the stirrup 26 and engaging the lower end of the steelyard rod 27. A pair of nuts 37 threaded onto the steelyard rod 27 one above and one below the spring 35 allow the spring 35 to be stressed so that the steelyard rod 27 is maintained in contact with the screw 36 during approximately the first half of the weighing capacity of the scale. Upon a further increase in load the initial tension of the spring 35 is exceeded and the spring deflects allowing the stirrup 26 to move relative to the steelyard rod 27. The resulting movement of the lever 21 lowers the struts 20 and permits the bellows in the pressure receivers 16 to be slightly shortened. (The bellows are the externally stressed type substantially as indicated in Figures III and V. In the event that internally stressed bellows are employed the struts 20 would be attached to the lower end of the bellows and the deflection of the lever 21 would cause the bellows to increase in length.) The decrease in length of the bellows within the pressure receiver 16 causes a portion of the hydraulic pressure to be expended in deflecting the bellows and that amount is subtracted from the force which would otherwise be applied to the struts 20 with the result that the force transmission to the load counterbalancing mechanism is reduced to a degree such that the scale indicates correctly at full capacity.

In this example two force transmission paths at the pressure receiver are called into play during the second half of the weighing capacity of the scale. In the first path the hydraulic pressure acting on the bellows causes force to be transmitted through the strut 20 and the lever 21 to the load counterbalancing mechanism. The second path, called into action by the deflection of the spring 35 in the stirrup 26, consists of the bellows walls which acting as a spring transmit force directly to the bellows housing which is mounted on the framework or stand 17. The correction of error is obtained by diverting a portion of the load force from the counterbalancing mechanism.

A second example of a pressure receiver constructed to provide parallel force transmission paths is illustrated in Figures III and IV. In this example an inverted cup-shaped bellows housing 38 contains a bellows 39 provided at its upper end with a cap 40 secured to the upper end of a strut 41. The lower end of the strut 41 carries a bearing 42 which rests on a knife edge 43 set in a gathering lever 44. The lower end of the bellows 39, by means of a ring 45, and an annular nut 46, is sealed to an annular diaphragm 47 whose outer periphery is clamped into the bottom of the bellows housing 38 by a threaded clamping ring 48.

This arrangement is designed to correct an error in which the scale indication is slow at half capacity. It employs two force transmission paths each including a nonlinear resilient element. The elements are arranged to be mutually corrective. If the diaphragm 47 is replaced with a solid annular member the scale shows a slow error at half capacity. When the annular diaphragm 47 is employed the hydraulic pressure acting within the bellows housing 38 acts against the upper surface of the diaphragm tending to deflect it downwardly. The deflection of a diaphragm under load is known to be nonlinear because of the load supporting effect of the tensile forces created in the diaphragm as it is deflected away from its neutral position. Therefore the deflection of the diaphragm is proportionately greater during the first portion of the weighing range and decreases as the load increases. The deflection of the diaphragm is applied to the lower end of the bellows 39 to stretch the bellows. The force required to stretch the bellows is transmitted from the bellows to the cap 40 and the strut 41 and serves to increase the force transmission from the capsule to the load counterbalancing mechanism during the first half of the weighing capacity without materially affecting the force transmission during the second half when the diaphragm is relatively stiffer. This has the effect of correcting the slow error at half capacity without causing a full capacity error as would occur with an adjustment of lever ratio.

In this second example the first force transmission path is from the capsule through the hydraulic fluid to the bellows cap 40 and through the strut 41 to the counterbalancing lever system. The second force transmission path is through the hydraulic fluid to the diaphragm 47—the bellows support—and through the bellows 39, the bellows acting as a spring, to the cap 40 and the strut 41. The nonlinear characteristic of the diaphragm is added to the nonlinear characteristic of the hydraulic system to provide the required correction.

In the first example the correction is applied after the force transmitted through the several force transmitting systems is combined and is therefore proportional to the total load. This is satisfactory as long as the loads are placed symmetrically or nearly so on the load receiver. If a concentrated load equal to one quarter of the weighing capacity of the scale were placed at one corner of the load receiver the loaded capsule and pressure receiver would be operating at full capacity but, the total load being one quarter of the scale capacity, the corrective action of the spring 35 would not be effective. The spring 35 can not come into play until a load equal to half capacity is applied to the scale whether that load be centrally located or not.

A preloaded spring assembly operating similarly in principle to that of the first example but applied to the individual pressure receivers is illustrated in Figures V and VI. A bellows 49 is rigidly mounted on a ring 50 screwed into the mouth of a cup-shaped bellows housing 51. The upper end of the bellows 49 is fitted with a cap 52 to which is secured the upper end of a strut 53 whose lower end is fitted with a flat bearing 54 resting on a load pivot 55 of a gathering lever 56. The preloaded spring assembly is included in the upper end of the strut 53. The spring assembly comprises an upper spring retainer 57, to which the bellows cap 52 is attached, having a tenon 58 extending downwardly into a hole 59 bored axially into the upper end of the strut 53. A pair of shallow cone spring washers 60 are placed over the tenon 58 and are compressed between the spring seat formed as the lower surface of the retainer 57 and a flat washer 61. A sleeve 62 is fitted over the end of the tenon 58 to abut the lower surface of the solid washer 61 and hold it against the spring washers 60. The desired initial load is applied to partially compress the spring washers 60 while the sleeve 62 is held in a fixture and the tenon 58 is free to slide within the sleeve. While the load is maintained the sleeve 62 is welded to the tenon 58 so that the preloaded adjustment of the springs 60 is thereafter maintained.

When this device is in operation the solid washer 61 and the sleeve 62 are held firmly in contact during the first half of the weighing capacity of the capsule. As the hydraulic pressure increases due to increase in load carried on a particular capsule, the force transmitted through the springs 60 increases beyond the preload force and the bellows cap is allowed to deflect downwardly against the resiliency of the spring washers 60. The force required to produce the deflection of the bellows walls as the spring washers 60 deflect is subtracted from the available force transmitted through the pressure receiver so that the force transmission through the combined system is maintained substantially correct throughout the full weighing capacity of the particular capsule and pressure receiver.

Inasmuch as the correction is applied individually to each hydraulic system of the weighing scale the correction is effective regardless of the distribution of load on the platform or load receiver.

As in the previous examples two parallel force transmission paths are employed. In this example the first path is through the hydraulic fluid and against the top of the bellows cap 52 and through the strut to the lever. The second force transmission path, called into action by deflection of the spring washers 60, is from the bellows cap 52 through the bellows walls acting as a spring to the bellows housing 51. The amount of force diverted through the second path is that required to deflect the bellows and is sufficient to secure correct full capacity indication when the lever system and the counterbalance is adjusted for correct zero and half capacity indication.

Occasionally automatic counterbalances such as springs or pendulums are employed in connection with hydraulic force transmission systems in the construction of a weighing scale. When a spring or pendulum is used the connected lever system deflects according to load and assumes a definite position for each magnitude of load. When such a system is used a portion of the load force may be diverted for corrective purposes by allowing a portion of the lever system to contact and deflect a spring during a portion of the lever oscillation. In the fourth example illustrated in Figures VII and VIII load forces which have been converted into hydraulic pressures are transmitted through tubes 63 to hydraulic fluid contained within cup-shaped bellows housings 64. The bellows housings are mounted on a beam stand base 65 which also includes fulcrum stands 66 on which a gathering lever 67 is fulcrumed. Bellows 68 contained within the bellows housings 64 are operatively connected through struts 69 to knife edges 70 carried in the lever 67. A power pivot 71 fixed in the end of the lever 67 engages a bearing block 72 of a stirrup 73 suspended from a steelyard rod 74. The steelyard rod 74 is connected to a spring or pendulum counterbalance adapted to counterbalance and indicate the load applied to the load receiver.

During the first part of the weighing capacity range the hydraulic forces are counterbalanced by the force applied from the spring or pendulum counterbalance through the lever 67 plus the spring effect of the bellows 68. The scale is adjusted so that it gives correct indications at no load and at half capacity. If the counterbalance device is precisely accurate and linear, such adjustment will usually produce an error in the plus or fast direction at full capacity. This error is eliminated by allowing collars 75 set on the struts 69 to contact springs 76 during the second half of the weighing capacity of the scale. In this manner sufficient force is diverted from the counterbalance to substantially eliminate the full capacity error of the scale.

The described examples of the invention utilize the spring effect of the bellows in combination with another resilient element to secure error correction. In general this is the preferable method because the effect of the elasticity of the bellows upon the weighing is much greater than the effect of the elasticity of the membrane 11 of the capsule 6. Some capsule designs have sufficient elasticity or spring effect to allow that spring effect to be used as a corrective force transmission path. In Figure IX a capsule 77 having a base 78, a diaphragm 79 and a membrane 80 is illustrated. The diaphragm 79 carries a box-like frame 81 having a bar 82 set into its upper portion in position to support a suspending link of a load receiver. The membrane 80 which may be of rubber or other flexible material is stretched across the recess in the capsule base 78 and supports the diaphragm 79. Hydraulic fluid is confined beneath the membrane 80 and by way of a pipe 83 is connected to a pressure receiver. As long as the hydraulic fluid contained within the capsule and the pipe 83 is substantially incompressible and no deflection of the bellows at the receiving end is permitted there is no deflection or settling of the diaphragm 79 and therefore all of the load force applied to the diaphragm is converted into hydraulic pressure. When it is necessary to divert part of the load from the counterbalance such diversion may be accomplished by connecting an expansible chamber to the pipe 83 so that the diaphragm 79 may settle and be partially supported by tensile stresses set up in the membrane 80.

Again two load supporting force transmission paths are employed, the first being directly through the hydraulic fluid and the second being through the membrane 80 to the capsule base 78. The division of force between these paths is controlled by the expansion of the expansible chamber or other means for withdrawing hydraulic fluid from the capsule in some predetermined relation to the load on the load receiver. The expansible chamber may be a closed end rubber tube 84 connected to a pipe T85 inserted in the pipe 83. A portion of the rubber tube 84 is covered by a rigid tube 86 so that the expansion of the tube 84 is limited to its exposed portion and may be adjusted by sliding the rigid tube 86 along the rubber tube.

Other types of expansible chambers such as bellows resisted by nonlinear springs or air pockets in the line 83 may also be employed when their expansion versus pressure characteristics are suitable for the correction required.

The general method of the error correction set out in these examples is the employment of parallel force transmission paths each containing a resilient element in which the characteristics of one resilient element cooperate with the overall characteristics of the hydraulic force transmission system to add or divert forces from the hydraulic force transmission system to provide a precisely constant overall force transmission ratio unaffected by the magnitude of a load being counterbalanced on the weighing scale.

The method and devices have been described primarily as compensating for an error appearing as a slow indication at half capacity. By changing the nonlinear characteristics of the resilient elements, they may be made to compensate for errors exhibited as a fast indication at half capacity.

The slow indication at half capacity is most often encountered when pressure receivers employing externally stressed bellows are used. Errors of a reverse sign are occasionally encountered when internally stressed bellows are employed. However, the externally stressed bellows is preferred because of its greater stability under load. When complementary errors are found in internally stressed and externally stressed bellows they may be combined as parallel mutually corrective transmission paths.

The errors appear to be inherent in the bellows and are probably occasioned by the deflection of the various folds of the bellows walls as the loads are applied. The magnitude of effect is small but nevertheless the greatest source of error and is probably due to small second-order effects in the deflection of the bellows walls under load.

Various modifications of structure employing the corrective method may be devised as required for specific applications of hydraulic force transmitting systems.

Having described the invention, I claim:

1. In a weighing scale employing hydraulic force transmitting elements, in combination, a force transmission system serving as a support for a load receiver, the system comprising a hydraulic capsule, a hydraulic line and a bellows operatively connected to load counterbalancing and indicating mechanism, the system having parallel force transmission paths one of which includes the elastic resistance to deformation of the capsules and bellows serving as a support for the load receiver, and a resilient element within the system for effecting a change in load distribution between the paths as the applied load is varied.

2. In a weighing scale employing hydraulic force transmitting elements, in combination, a force transmission system serving as a support for a load receiver, the system comprising a hydraulic capsule, a hydraulic line and a bellows operatively connected to load counterbalancing and indicating mechanism, said system providing a hydraulic force transmission path, said system having a second force transmission path that includes the elastic resistance to deformation of an element of the force transmission system, and a resilient element with the system for effecting a change in force distribution between the paths as the transmitted force is varied.

3. In a weighing scale employing hydraulic force transmitting elements, in combination, a force transmission system serving as a support for a load receiver, the system comprising a hydraulic capsule, a hydraulic line and a bellows operatively connected to load counterbalancing and load indicating mechanism, and a force transmission ratio correcting member comprising a diaphragm that supports the bellows and that is yieldable in response to hydraulic pressure, the diaphragm serving to transmit force through the bellows functioning as an elastic connection between the diaphragm and the load counterbalancing mechanism to supply a correction to the force hydraulically applied to the bellows.

4. In a weighing scale employing hydraulic force transmitting elements, in combination, a force transmission system serving as a support for a load receiver, the system comprising a hydraulic capsule, a hydraulic line and a bellows operatively connected to load counterbalancing and load indicating mechanism, and a force transmission ratio correcting member comprising a bellows support that is yieldable in response to hydraulic pressure applied to it and that serves to transmit force through the bellows functioning as an elastic connection between the support and the load counterbalancing mechanism.

5. In a weighing scale employing hydraulic force transmitting elements, in combination, a force-transmitting system comprising a hydraulic capsule serving as a support for a load receiver, a hydraulic line connected to the capsule, a bellows connected to the line, and linkage operatively connecting the bellows to load counterbalancing mechanism, said transmitting system having parallel force transmission paths one being through the elastic resistance to deformation of portions of the system for diverting some of the load force from the counterbalancing mechanism, and a resilient member in the system between the portions having parallel transmission paths and the counterbalancing mechanism whose yielding under load varies the force distribution between the parallel paths.

6. In a weighing scale employing hydraulic force transmitting elements, in combination, a force-transmitting system comprising a hydraulic capsule serving as a support for a load receiver, a hydraulic line, a bellows connected to the line and to load counterbalancing mechanism, and a distensible hydraulic chamber in communication with the capsule for varying the quantity of fluid in the capsule and thus the load carried by the capsule acting as a spring.

7. In a weighing scale employing hydraulic force-transmitting elements, in combination, a force-transmitting system comprising a hydraulic capsule serving as a support for a load receiver, a hydraulic line connected to the capsule, a bellows assembly connected to the hydraulic line, means for connecting the bellows assembly to load counterbalancing mechanism, and a preloaded resilient member included in said means.

8. In a weighing scale employing hydraulic force-transmitting elements, in combination, a force-transmitting system comprising a hydraulic capsule serving as a support for a load receiver, a resilient bellows in hydraulic communication with the capsule, linkage connecting the bellows to load counterbalancing mechanism, a strut in the linkage, and a preloaded spring in the strut permitting the strut to yield in response to predetermined loads.

9. In a weighing scale employing hydraulic force-transmitting elements, in combination, a force-transmitting system comprising a hydraulic capsule serving as a support for a load receiver, a resilient bellows in hydraulic communication with the capsule, linkage connecting the bellows to load counterbalancing mechanism, a strut in the linkage, and preloaded resilient means in the strut permitting the strut to yield in response to predetermined loads.

10. In a weighing scale employing hydraulic force-transmitting elements, in combination, a hydraulic capsule serving as a support for a load receiver, a resilient bellows in hydraulic communication with the capsule, linkage connecting the bellows to load counterbalancing mechanism, a telescoping strut in the linkage, and a pair of preloaded spring washers for resisting telescoping of the strut.

11. In a weighing scale employing a hydraulic force transmitting system, in combination, a first member and a second member forming relatively movable ends of a chamber, a bendable substantially non-stretchable element interconnecting said members to serve at least in part as the side wall of the chamber and which resiliently opposes relative motion of said members, a hydraulic fluid contained within the chamber and tending to separate the members with a force proportional to the pressure of the fluid, and a resilient member included in the system and subjected to force proportional to load for altering the distance between said members at a rate that is a non-linear function of the hydraulic pressure, whereby the bendable sidewall material exerts a force acting between the members for correcting non-linear errors in the translation of hydraulic pressure to mechanical force.

12. In a weighing scale employing hydraulic force transmitting elements, in combination, a load counterbalancing mechanism, a generally cup-shaped housing into which hydraulic fluid is admitted at a pressure proportional to a load on the scale, an elastic bellows, means for supporting one end of the bellows from the mouth of the housing, and means for connecting the other end of the bellows to the load counterbalancing mechanism, at least one of said means being yieldable throughout at least part of the weighing capacity of the scale for effecting changes in the length of the bellows, whereby the change in length of the bellows combined with the elastic force of the bellows corrects errors in the translation of hydraulic pressure to mechanical force.

13. In a weighing scale employing hydraulic force transmitting elements, in combination, a load counterbalancing mechanism, generally cup-shaped housing into which hydraulic fluid is admitted at a pressure proportional to a load on the scale, a bellows having an appreciable spring rate inserted into the housing, a diaphragm for connecting the bellows to the housing, and means connecting the other end of the bellows to the load counterbalancing mechanism, said diaphragm having a stiffness such that its deformation under pressure generates a spring force in the bellows sufficient to correct the errors in its force to pressure translation ratio.

14. In a hydraulic weighing scale, in combination, a hydraulic force transmission system comprising force to pressure translating elements exhibiting non-linear errors and a hydraulic line interconnecting the elements, one of the elements serving to receive load forces and the other being operatively connected to load counterbalancing and indicating mechanism, elastic portions included in at least one of the elements, which portions resist deformation of the element, and a resilient member included in the system and subjected to force proportional to load and adapted to vary the deformation of that one of the elements containing the elastic portions whereby the elastic resistance to deformation generates a force to correct the exhibited error in force transmission.

LAWRENCE S. WILLIAMS.

REFERENCES CITED

The following references are of record in the file of this patent:

UNITED STATES PATENTS

| Number | Name | Date |
| --- | --- | --- |
| 1,585,732 | Otto et al. | May 25, 1926 |
| 1,916,635 | Pepper | July 4, 1933 |
| 1,929,198 | Crawford | Oct. 3, 1933 |
| 2,244,621 | Hurt | June 3, 1941 |
| 2,313,509 | Bohannan | Mar. 9, 1943 |
| 2,379,207 | Williams | June 26, 1945 |
| 2,405,619 | Sutton | Aug. 13, 1946 |
| 2,439,533 | Williams | Apr. 13, 1948 |